(12) United States Patent
Betts

(10) Patent No.: US 6,891,896 B1
(45) Date of Patent: May 10, 2005

(54) EMBEDDED SIGNAL CONSTELLATIONS

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 739 days.

(21) Appl. No.: 09/769,591

(22) Filed: Jan. 25, 2001

Related U.S. Application Data

(60) Provisional application No. 60/181,433, filed on Feb. 10, 2000.

(51) Int. Cl.[7] ............................. H04L 23/02; H04L 5/12
(52) U.S. Cl. ....................................... 375/264; 375/265
(58) Field of Search ................................ 375/265, 262, 375/341, 264, 261, 298; 714/792, 795, 794

(56) References Cited

U.S. PATENT DOCUMENTS

| | | | |
|---|---|---|---|
| 4,464,767 A | | 8/1984 | Bremer ........................ 375/67 |
| 4,660,214 A | * | 4/1987 | Pahlavan et al. ........... 375/262 |
| 5,103,227 A | | 4/1992 | Betts ............................ 341/61 |
| 5,394,440 A | * | 2/1995 | Goldstein et al. ........... 375/265 |
| 6,026,120 A | | 2/2000 | Betts .......................... 375/261 |
| 6,101,223 A | | 8/2000 | Betts .......................... 375/261 |
| 2001/0028630 A1 | * | 10/2001 | Burshtein et al. ........... 370/207 |

* cited by examiner

*Primary Examiner*—Phuong Phu
(74) *Attorney, Agent, or Firm*—Thomas, Kayden, Horstemeyer & Risley LLP

(57) ABSTRACT

The invention enables a communication device to efficiently communicate large circular signal constellations by embedding a square signal constellation in each of the circular signal constellation points. By embedding a square signal constellation in the error free slicing region associated with each circular constellation signal point, the beneficial shape of the circular constellation is retained while significantly increasing the amount of information that can be transmitted in each constellation. The invention allows the communication of high bit-per-symbol signal constellations (on the order of 15 or more bits-per-symbol) without the added cost of external memory for large look-up tables or the cost and power consumption of line drivers required to communicate high peak factor square signal constellations.

27 Claims, 11 Drawing Sheets

256 point power indexed
quadrant symmetric
constellation
8-bit

EMBEDDED SIGNAL CONSTELLATIONS

CROSS REFERENCE TO RELATED APPLICATION

This document claims priority to and the benefit of the filing date of now abandoned and commonly assigned U.S. Provisional Patent Application entitled EMBEDDED SQUARE SIGNAL SPACE CONSTELLATIONS, assigned Ser. No. 60/181,433, and filed Feb. 10, 2000, hereby incorporated by reference.

TECHNICAL FIELD

The invention relates generally to data communications, and more particularly, to increasing the data rate performance in a data communications system.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modem communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office (CO) to the user, or remote location, typically referred to as the customer premises (CP). DSL communication devices use different formats and different types of modulation schemes and achieve widely varying communication rates. However, even the slowest DSL communications devices achieve data rates far in excess of conventional point-to-point modems.

Some of the available modulation schemes include quadrature-amplitude modulation (QAM), carrierless amplitude/phase (CAP) and discrete multi-tone (DMT). Early QAM modems and all CAP and DMT transceivers use square signal constellations, which are relatively simple to implement, but which suffer from 0.2 dB performance loss and a high 6 dB peak factor. Peak factor refers to the highest power level associated with any point in the signal constellation. High peak factor leads to higher energy required to transmit those square signal constellations.

To improve the performance and lower the peak factor, circular signal constellations were introduced. Circular signal constellations have improved performance and lower overall peak factor than square signal constellations. Efficient coding tables are available for generating the constellations for 10 to 12 bit-per-symbol constellations. Coding tables are look-up tables that relate each point in a signal constellation to an associated vector. The vector represents the phase and amplitude of the particular signal point represented in a two-dimensional arrangement. Unfortunately, at bit-per-symbol densities higher than 12 bits, the coding tables become quite large and unmanageable. For example, for a 15 bit per symbol circular constellation, the coding table includes 27,806 code words. This would require an extraordinarily large amount of memory and consume valuable microprocessor time to implement.

This situation is unfortunate because the copper wire pairs over which DSL transceivers operate are capable of supporting extremely high data rates, allowing the transmission of 15 bits-per-symbol or greater.

Therefore, it would be desirable to provide a way of communicating high bit-per-symbol circular signal constellations without the need for implementing unduly large look-up tables and without the need for implementing the high-powered line drivers required for communicating high peak factor square signal constellations.

SUMMARY

The invention enables a communication device to efficiently communicate large circular signal constellations by embedding one or more signal constellations in each of the circular signal constellation points. By embedding a signal constellation in the error free slicing region associated with each circular constellation signal point, the beneficial shape of the circular constellation is retained while significantly increasing the amount of information that can be transmitted in each constellation.

The invention allows the communication of high (on the order of 15 or more bits-per-symbol) bit-per-symbol signal constellations without the added cost of external memory for large look-up tables or the cost and power consumption of line drivers required to communicate high peak factor square signal constellations.

BRIEF DESCRIPTION OF THE DRAWINGS

The invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE INVENTION

Figure 1:
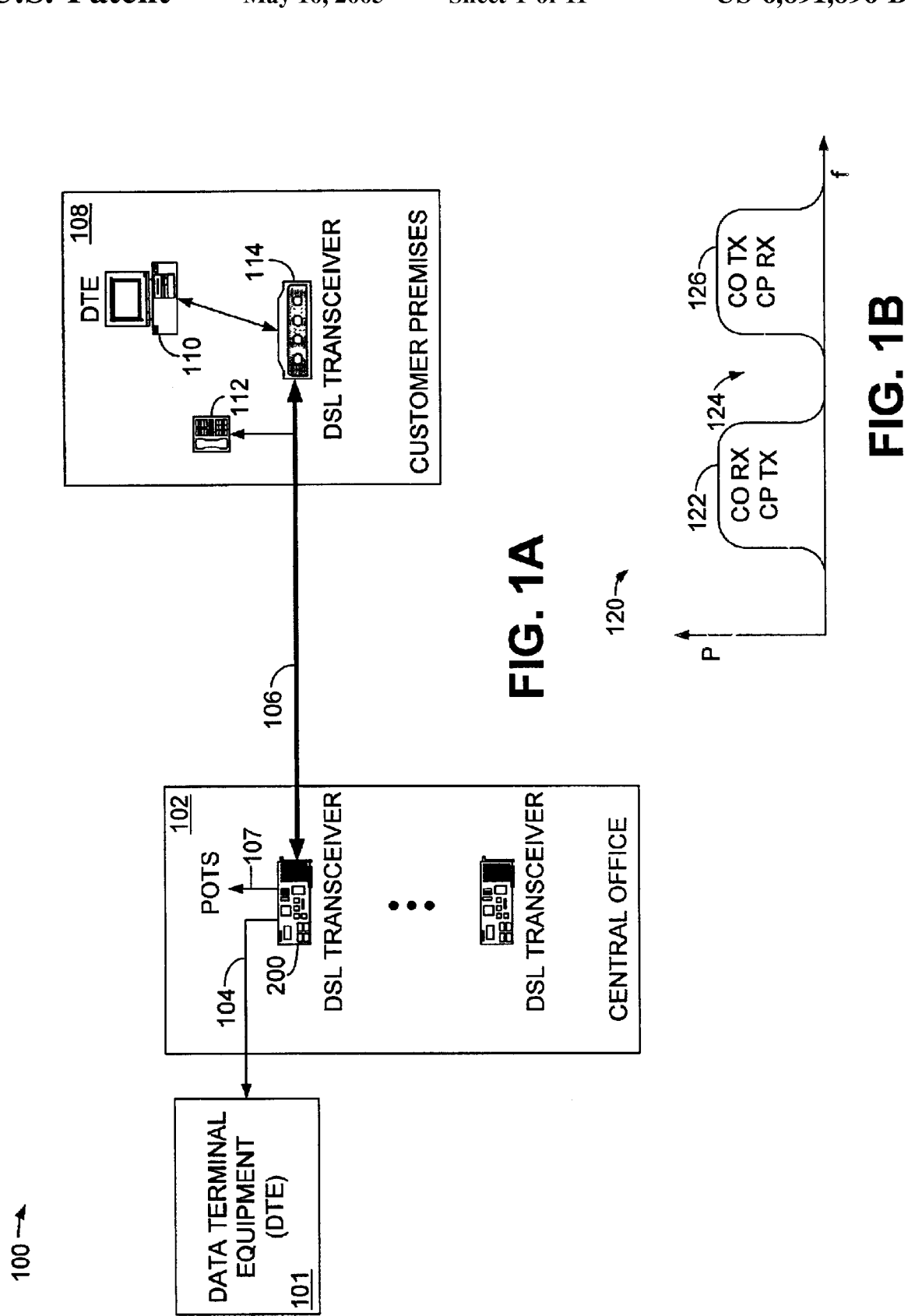
FIG. 1A is a block diagram illustrating an exemplar digital subscriber line communication environment in which the present invention resides.
FIG. 1B is a graphical representation illustrating the frequency spectrum of the communication that occurs between central office and customer premises of FIG. 1A.

Although described with particular reference to an asymmetric digital subscriber line (ADSL) communication system, the embedded signal constellations of the invention can be advantageous in any communication system using circular signal constellations. Furthermore, while described with particular reference to embedding square signal constellations into circular constellation signal points in which the circular constellation signal points are arranged in relation to an orthogonal pair of axes, the invention is equally applicable to circular constellations that are arranged in other formats. For example, the invention is applicable to embedding hexagonal constellations into circular constellation signal points where the circular constellation signal points are arranged in a hexagonal format.

Furthermore, the embedded signal constellations can be implemented in software, hardware, or a combination thereof. In a preferred embodiment, the elements of the invention are implemented in software that is stored in a memory and that configures and is executed by a suitable microprocessor (AP) or digital signal processor (DSP) situated in a communication device. The hardware portion of the invention can be implemented using specialized hardware logic. The software portion can be stored in a memory and be executed by a suitable instruction execution system (microprocessor). The hardware implementation of the embedded signal constellations can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the embedded signal constellations software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to the drawings, FIG. 1A is a block diagram illustrating an exemplar digital subscriber line communication environment 100 in which the present invention resides. The DSL communication environment 100, for illustrative purposes only, is an asymmetric digital subscriber line (ADSL) communication environment. However, other communication environments are contemplated by the invention. For example, the invention contemplates the use of symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL) and also contemplates non-DSL communications systems that use circular signal constellations.

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 can be point-to-point full duplex ADSL, using discreet multi-tone (DMT) line coding. Other communication schemes are possible between central office 102 and customer premises 108, such as variations of multi-point and half duplex as well as other line coding formats, such as QAM, CAP, etc.

Central office 102 includes a number of DSL transceivers, an exemplar of one of which is illustrated using reference numeral 200. DSL transceiver 200 exchanges information with data terminal equipment (DTE) 101 via connection 104 and interfaces to communication channel 106 in order to communicate with DSL transceiver 114 located at customer premises 108. DTE 101 can be, for example, a computer with which the DTE 110 in customer premises 108 is communicating, or can represent access to the Internet.

DSL transceiver 114 located at customer premises 108 connects to DTE 110 and plain old telephone service (POTS) device 112 connects directly to communication channel 106. Although omitted for clarity, a POTS splitter or filter is typically installed between the communication channel 106 and POTS device 112 to prevent the POTS device 112 from interfering with the DSL communication and to prevent DSL signals from degrading POTS performance. DTE 110 can be a personal computer and POTS device 112 can be a typical telephone. Typically, the DSL transceiver 114 is located in a home or office, and is used to allow simultaneous data communication (using DTE 110) and voice communication (using POTS device 112).

DSL transceiver 114 communicates over communication channel 106 with DSL transceiver 200 in order to exchange data information. Simultaneously with the data, voice information can transmitted over communication channel 106 and separated by DSL transceiver 200 via connection 107 and sent to typical telephone company POTS switching equipment (not shown). Data is exchanged between customer premises 108 and central office 102 in order to allow DTE 110 to access, for example, DTE 101, which may be an Internet access device provided by an internet service provider (ISP).

Although illustrated using a single customer premises 108 connected to central office 102, typically a number of customer premises locations will be connected to one central office 102 using a plurality of communication channels similar to communication channel 106. Furthermore, it is also possible for a number of customer premises locations to be connected to one DSL transceiver located at a central office. However, for purposes of explanation, the invention will be described with reference to a single customer premises 108 communicating with a single DSL transceiver 200 located at central office 102. Furthermore, the invention described hereafter is embodied in both DSL transceiver 200 located at central office 102 and in DSL transceiver 114 located at customer premises 108. However, for ease of illustration, only a single DSL transceiver 200 will be described below.

FIG. 1B is a graphical representation illustrating the frequency spectrum of the communication that occurs between central office 102 and customer premises 108 of FIG. 1A. The vertical axis of graph 120 represents transmission power and the horizontal axis of graph 120 represents frequency. Generally, the communication that occurs between DSL transceiver 200 and DSL transceiver 114 is divided by frequency, with the transmission from central office 102 toward customer premises 108 (downstream) occurring at a frequency higher than the transmission of information from DSL transceiver 114 located at customer premises 108 toward the DSL transceiver 200 located at central office 102 (upstream). For example, the curve indicated using reference numeral 122 represents upstream transmission from the customer premises 108 toward the central office 102, and the curve indicated using reference numeral 126 represents downstream transmission occurring from the central office 102 toward the customer premises 108. Transmission from the customer premises 108 toward the central office 102 is generally lower in frequency in order to avoid cross-talk that may occur as the signal gets nearer to the central office 102 and an increasing number of communication channels, such as channel 106, are bundled together in common cable bundles. Transmission from the central office 102 toward the customer premises 108 are subject to impairments caused by impulse noise generating elements, such as 60 Hz light dimmers and other low frequency, impulse generating elements. Furthermore, although shown as a discreet difference in frequencies indicated by region 124 in FIG. 1B, it is possible that there is some overlap occurring between the curves 122 and 126. Further still, although shown as symmetric in nature for simplicity, the curves 122 and 126 may not appear identical. For example, the curve 122 might be higher in power and occur over a shorter frequency spectrum than curve 126.

Generally, data and voice communication between DSL transceiver 200 and DSL transceiver 114 is accomplished by encoding a serial bit stream into a signal space constellation. The signal constellation includes a number of points that each represents a particular magnitude and phase of a communication signal at a given time. The number of points in the signal constellation is related to the number of bits encoded into the constellation and is also related to the available transmit power, or signal-to-noise ratio available in the communication channel. For example, with all factors being equal, a communication channel having a higher signal-to-noise ratio than another communication channel is said to have higher "margin" and is capable of communicating more bits-per-symbol (a symbol being a signal constellation that represents n-bits) without error than the communication channel having lower margin. Circular signal constellations are generally preferred over square constellations because they offer an approximate 0.2 dB performance improvement and have a lower peak factor.

Figure 2:
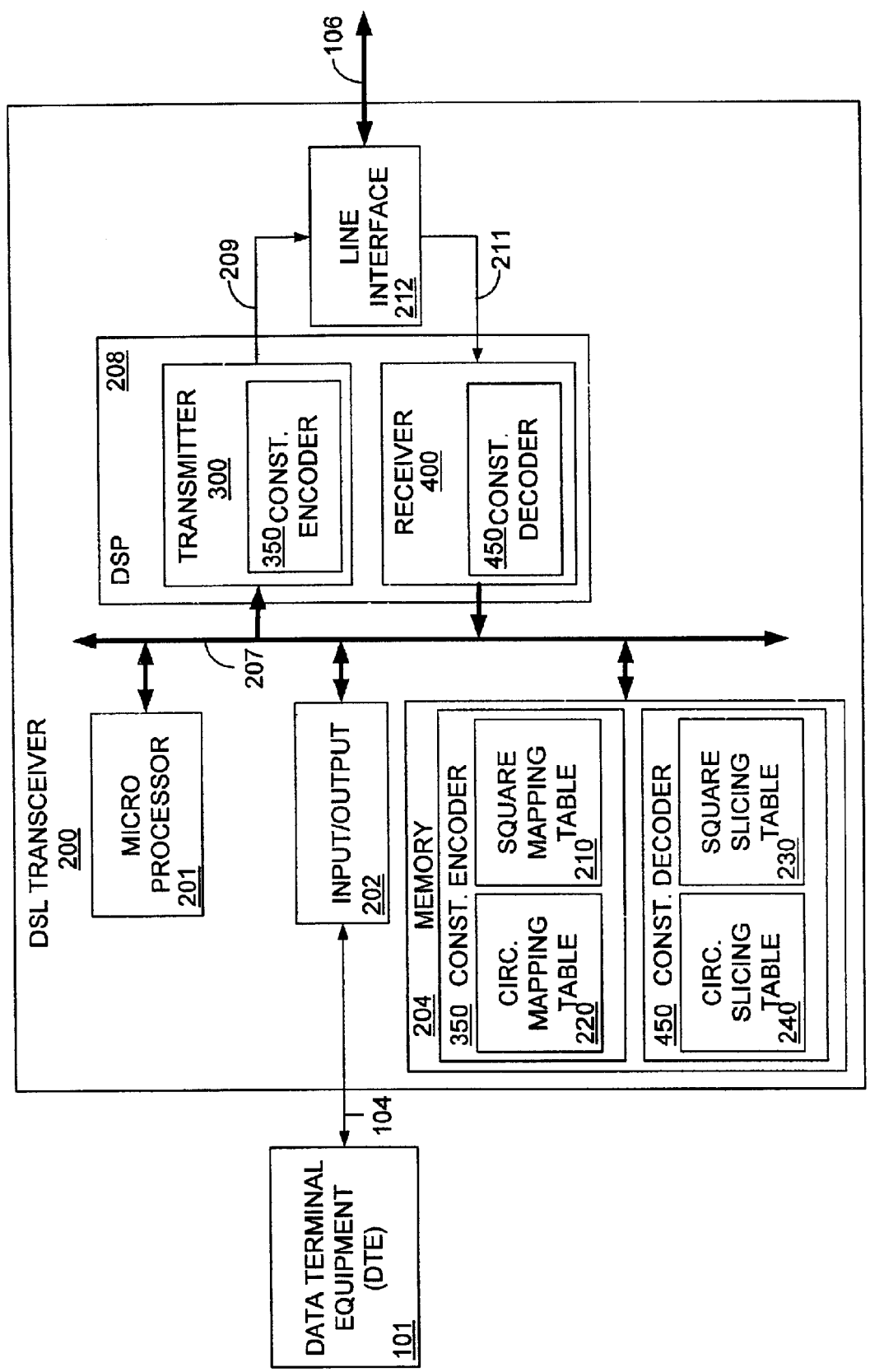
FIG. 2 is a block diagram illustrating the DSL transceiver of FIG. 1A.

FIG. 2 is a block diagram illustrating the DSL transceiver 200 of FIG. 1A. The DSL transceiver 200 communicates with DTE 101 via connection 104 where data supplied to and received from DTE 101 is exchanged via input/output element 202 within DSL transceiver 200. DSL transceiver 200 also includes microprocessor 201 and memory 204 in communication via bus 207 with digital signal processor (DSP) 208. DSP 208 includes a transmitter 300 and a receiver 400. Transmitter 300 includes constellation encoder 350, which encodes a series of bits into signal points in a circular signal space constellation and also encodes a portion of those bits as an additional square signal constellation added to, or overlaid on, each circular constellation point. Preferably, the logic for embedding square signal constellations is program code that is stored in the memory 204 and executed in the DSP 208. Therefore, the constellation encoder 350, along with the square mapping table 210 and the circular mapping table 220 are shown as residing within memory 204. Alternatively, the memory 204 and the microprocessor 201 may work in cooperation to store and execute the constellation encoder logic 350 of the invention. The constellation encoder 350 operates in conjunction with look-up tables for the square and circular constellations. Accordingly, the square mapping table 210 and the circular mapping table 220 are shown as residing within the constellation encoder 350 and within the memory 204. The square mapping table 210 and the circular mapping table 220 store the vector values (the X and Y coordinates) for the code words that are used to encode the embedded square and circular constellations. The constellation encoder 350 is sometimes referred to as a "mapper."

Receiver 400 includes constellation decoder 450, which decodes each signal point in the circular signal space constellation having at least an additional encoded square signal constellation to obtain the original bits. Similar to the constellation encoder logic, the constellation decoder logic is preferably, program code that is stored in the memory 204 and executed in the DSP 208. Therefore, the constellation decoder 450, along with the square slicing table 230 and the circular slicing table 240 are shown as residing within memory 204. Alternatively, the memory 204 and the microprocessor 201 may work in cooperation to store and execute the constellation decoder logic of the invention. The constellation decoder 450 operates in conjunction with the slicing tables for the square and circular constellations. Accordingly, the square slicing table 230 and the circular slicing table 240 are shown as residing within the constellation decoder 450 and within the memory 204. The square slicing table 230 and the circular slicing table 240 store the index values for the code words that are used to decode the embedded square constellations and the circular constellations. The constellation decoder 450 is sometimes referred to as a "slicer" or a "demapper."

Although DSP 208 as illustrated includes the transmitter 300 and receiver 400 of the invention, the transmitter 300 and receiver 400 may be implemented separately. The constellation encoder 350 and constellation decoder 450 enable the DSL transceiver 200 to reliably, economically and efficiently increase the number of bits-per-symbol transmitted without increasing the power required to transmit the additional bits. For example, by using the constellation encoder 350 and constellation decoder 450 in accordance with the invention, it is possible for signal space constellations that previously carried 8 or 9 bits to carry 10 or 11 bits, respectively. Larger constellation may also be encoded by applying the logic of the constellation encoder 350 and constellation decoder 450 multiple times in the same constellation. As will be described below, it is possible to encode a square signal constellation at each point in a circular signal constellation, and then encode another square signal constellation for each point in the first square signal constellation.

Transmitter 300 communicates via connection 209 with line interface 212 in order to gain access to communication channel 106. Similarly, receiver 400 receives signals from line interface 212 via connection 211.

Figure 3:
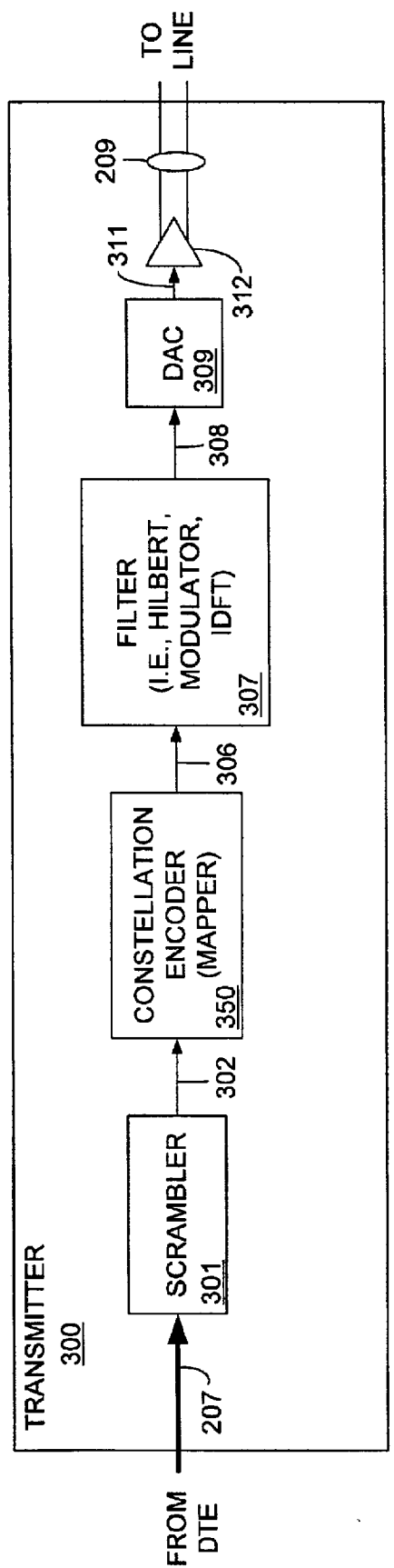
FIG. 3 is a block diagram illustrating the transmitter of FIG. 2.

FIG. 3 is a block diagram illustrating the transmitter 300 of FIG. 2. The transmitter 300 is simplified and FIG. 3 shows only the elements of the transmitter 300 that are used to describe the invention. A data signal originating in DTE 101 is communicated via bus 207 to scrambler 301. The signal on connection 207 is in the form of a serial bit stream and the scrambler 301 provides a scrambled serial bit stream on connection 302. The scrambler 301 can be either a self-synchronized scrambler or a preset free running scrambler as is known in the art. Depending upon the application, the preset scrambler may have some advantages, as in the case where Reed-Solomon coding is used. The scrambler 301 provides a scrambled m bit word on connection 302 to the constellation encoder 350. Although omitted for clarity, the serial bit stream may first be supplied to a Reed-Solomon encoder for forward error correction, prior to being supplied to the constellation encoder 350. The optional RS encoder, if included, operates on the scrambled m bit word on connection 302 to provide forward error correction and provides the Reed-Solomon encoded serial bit stream including the RS encoded m bit words to the constellation encoder 350.

The output of the scrambler 301 on connection 302 is supplied to the constellation encoder 350. As will be described in greater detail below, the constellation encoder 350 encodes a portion of the bits of the word on connection 302 into a circular signal constellation and a portion of the bits of the word on connection 302 into a square signal constellation at each point of the circular signal constellation. In this manner, the additional shaping gain of 0.2 dB and approximate 1.7 dB lower peak factor of the circular signal constellation are retained while encoding additional bits into square signal constellations "embedded" at each circular signal constellation point.

Although omitted for clarity, an optional trellis encoder may be employed in conjunction with the constellation encoder 350. The trellis encoder operates sequentially on each word supplied to the constellation encoder 350. The trellis encoder can encode from one symbol in time to the next symbol.

The constellation encoder 350 encodes a signal constellation, which represents a two-dimensional symbol. In the case of a multi-dimensional system, multiple two-dimensional symbols are encoded. In the case of one dimensional pulse amplitude modulation (PAM) a signal constellation is one axis of the two-dimensional symbol.

The output of the constellation encoder 350 is supplied to filter 307. The filter 307 will exhibit different characteristics depending on the type of modulation being used. For example, in a CAP modulation system, the filter 307 is a Hilbert filter configured to receive the X and Y coordinates of the signal constellation on connection 306 and perform CAP modulation to provide a bandpass output on connection 308 at a certain frequency range. Alternatively, the filter 307 could be a modulator that receives the output of the constellation encoder 350 on connection 306 and that modulates the signal using a technique such as coded or uncoded quadrature amplitude modulation (QAM) as is known in the art. The modulator provides the sine and cosine components of the carrier frequency, or the X and Y values of the carrier frequency as is known in the art. In a DMT environment, the filter 307 can perform the inverse discrete Fourier transform (IDFT) of the signal on connection 306. It should be noted that in a DMT environment, a plurality of signal carriers, referred to as "tones," are each encoded with a signal constellation. The combined constellations forms a transmit symbol. In DMT, the IDFT element transforms the set of all tones (in parallel or taken together at one time) into a sequence of tone samples that are serially output on connection 308.

Regardless of the type of modulation employed, the output of the filter 307 on connection 308 is supplied to digital-to-analog converter (DAC) 309. The DAC 309 converts the digital domain signals on connection 308 to the analog domain on connection 311. The analog signal on connection 311 is amplified by differential transmit amplifier 312, which is the line driver for the transmitter 300, for transmission via connection 209 to the line interface 212 of FIG. 2 for transmission via communication channel 106. DAC 309 may include a filter (not shown) to help control the power spectrum density (PSD) for spectrum management.

Figure 4:
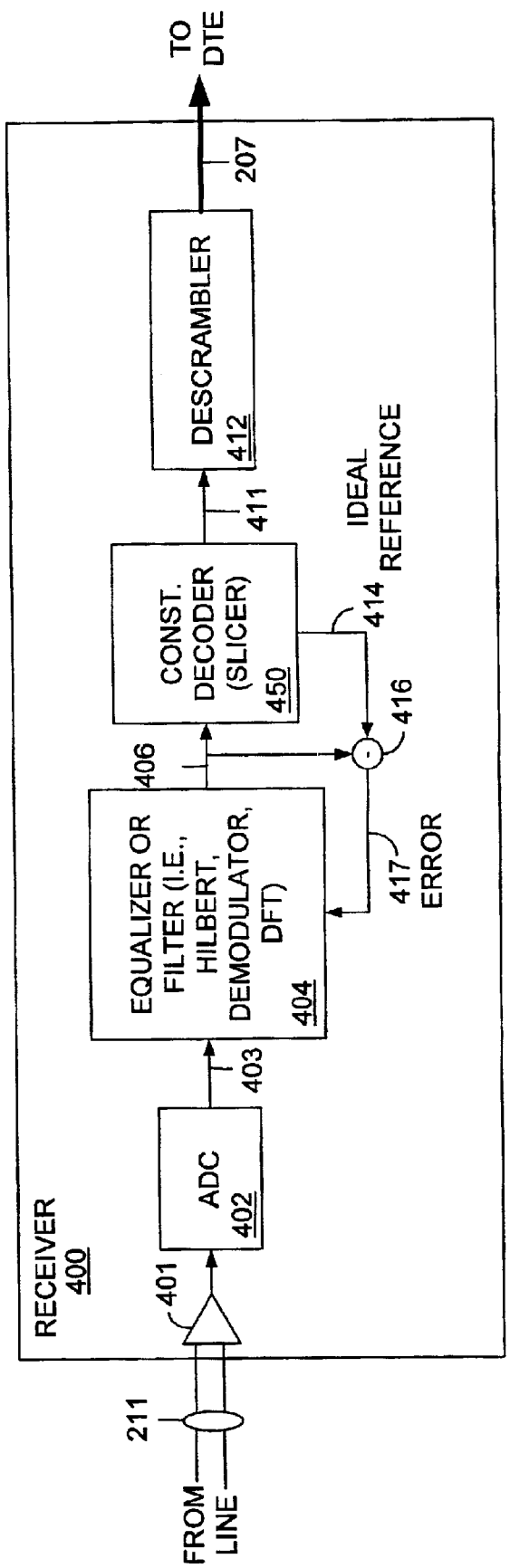
FIG. 4 is a block diagram illustrating the receiver of FIG. 2.

FIG. 4 is a block diagram illustrating the receiver 400 of FIG. 2. A signal received on communication channel 106 is supplied via line interface 212 (FIG. 2) via connection 211 to analog-to-digital converter (ADC) 402. ADC 402 may include a filter (not shown) and/or equalizer (not shown) to help control undesirable signals and intersymbol interference. ADC 402 converts the analog signal received on connection 211 into a serial bit stream of time domain samples that represent, on connection 403, the signal constellation encoded in the transmitter. The serial bit stream on connection 403 is supplied to filter 404. Filter 404 performs the reverse operation of the filter 307 of FIG. 3 by demodulating the serial bit stream on connection 403. For example, if the transmission system is DMT, the filter 404 performs a discrete Fourier transform (DFT) operation, thus transforming the time sequence of samples on connection 403 into a plurality of individual tones on connection 406. Alternatively, in the case of CAP modulation, the filter 404 is a Hilbert filter or passband equalizer configured to receive the serial bit stream on connection 403 and provide a demodulated signal having the signal constellation on connection 406. Furthermore, the filter 404 could be a demodulator that receives the output of the ADC 403 on connection 403 and that demodulates the QAM modulated signal as is known in the art. The output of the filter 404 is a demodulated signal constellation and is supplied over connection 406 to the constellation decoder 450.

The constellation decoder 450 outputs on connection 411 an index representing the constellation point received for each symbol. In addition, the constellation decoder 450 supplies an ideal reference signal representing the ideal vector that would have been received in the absence of any signal distortion over connection 414. This ideal reference signal is a vector that represents the ideal x and y values for each received signal constellation. The ideal reference signal on connection 414 is supplied to adder 416. Adder 416 subtracts the ideal reference signal from the output of the filter 404 on connection 406 to obtain an error signal on connection 417. The error signal is used to update the adaptive parameters (such as filter coefficients) of filter 404.

If Reed-Solomon error correction was employed in the transmitter, the output of the constellation decoder 450 is supplied to a RS decoder (not shown). The RS decoder removes the Reed-Solomon forward error correction and supplies the scrambled serial bit stream to descrambler 412. If Reed-Solomon error correction is not employed, the output of the constellation decoder 450 is supplied to the descrambler 412 via connection 411. Descrambler 412 descrambles the serial bit stream and supplies the original bit stream via connection 207 through the input/output element 202 (FIG. 2) and to DTE 101.

Figure 5:
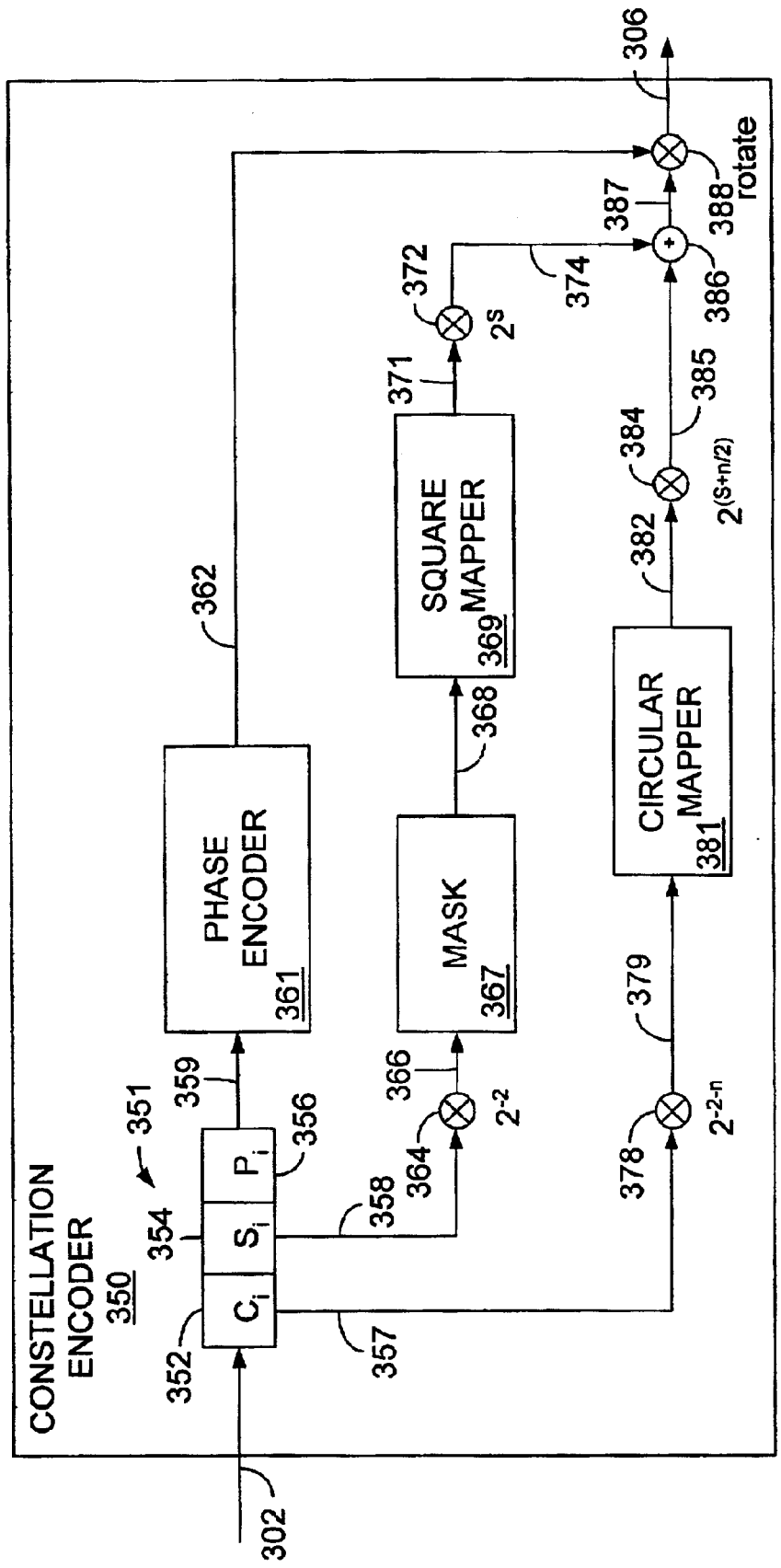
FIG. 5 is a block diagram illustrating in detail the constellation encoder of the transmitter of FIG. 2.

FIG. 5 is a block diagram illustrating in detail the constellation encoder 350 of the transmitter 300 of FIG. 2. The data, in the form of a serial bit stream, is supplied from the scrambler 301 (FIG. 3) on connection 302 to serial-to-parallel converter 351. The serial-to-parallel converter 351 can be implemented as a shift register that partitions the serial bit stream into three parallel levels of bits. These are the phase encoded bits $P_i$ 356, the embedded square bits $S_i$ 354 and the circular bits $C_i$ 352. The first two bits are phase bits $P_i$ and are supplied to phase encoder 361 via connection 359. The phase encoder 361 either directly or differentially phase encodes the two bits $P_i$ and supplies these phase encoded bits via connection 362 to rotator 388. When a power indexed signal constellation is used, the two phase-encoded bits determine whether the circular constellation is rotated 0°, 90°, 180° or 270°.

Next, depending upon whether two or four bits will be encoded into an embedded square constellation, either the next two or four bits $S_i$ 354 are supplied via connection 358 to scaling element 364. The bits on connection 358 are multiplied by a factor 22, effectively shifting away the two phase-bits 356. The output of scalar 364 on connection 366 is then supplied to mask element 367. Mask element 367 eliminates the higher order bits and provides an index into the embedded square mapping table. (See Table 1). Table 1 below illustrates one possible implementation of the embedded square mapping table in C programming format.

TABLE 1

```
/* Power Indexed 1, 1 Subset Encode Table. */
const int txencodSQ [32] = {
/*    0*/   1,   1,  -1,   1,   1,  -1,  -1,  -1,
/*    4*/   3,   1,  -3,   1,   3,  -1,  -3,  -1,
/*    8*/   1,   3,  -1,   3,   1,  -3,  -1,  -3,
/*   12*/   3,   3,  -3,   3,   3,  -3,  -3,  -3
}; /* End of Power Indexed Encode Table */
```

The output of mask element 367 on connection 368 is supplied to square mapper 369, which uses the embedded square mapping table shown in Table 1 to encode an embedded square signal constellation into each point of a circular signal constellation. The embedded square mapping table shown in Table 1 can be stored in the memory 204 of FIG. 2 and is referred to in FIG. 2 as the square mapping table 210. The output of the square mapper 369 on connection 371 is then supplied to scalar 372, where the value on connection 371 is scaled by a factor of $2^S$, where S is any convenient scalar, typically 7 or 8. This yields a mapped embedded square vector output on connection 374.

The circular bits $C_i$ 352 are supplied via connection 357 to scalar 378. The bits on connection 357 are scaled by a factor of $2^{-2-n}$ where n is the number of embedded square bits $S_i$ 354. This scaling operation effectively shifts away the embedded square and phase bits leaving only the circular bits $C_i$ 352. The output of the scalar 378 on connection 379 is supplied to circular mapper 381, which uses a circular mapping table shown below in Table 2 to map the circular bits on connection 379 into a circular signal constellation. The circular mapping table is shown in FIG. 2 where it resides in memory 204 and is referred to as circular mapping table 220. By residing in memory 204 (FIG. 2), the circular mapping table 220 can be accessed by the constellation encoder 350.

TABLE 2

```
/* Power Indexed 1, 1 Subset Encode Table. */
const int txencod[308] = {
/*    0*/    1,    1,   -3,    1,    1,   -3,   -3,   -3,
/*    4*/    1,    5,    5,    1,   -3,    5,    5,   -3,
/*    8*/    5,    5,   -7,    1,    1,   -7,   -7,   -3,
/*   12*/   -3,   -7,   -7,    5,    5,   -7,    1,    9,
/*   16*/    9,    1,   -3,    9,    9,   -3,   -7,   -7,
/*   20*/    5,    9,    9,    5,  -11,    1,    1,  -11,
/*   24*/   -7,    9,  -11,   -3,    9,   -7,   -3,  -11,
/*   28*/  -11,    5,    5,  -11,    9,    9,    1,   13,
/*   32*/   13,    1,  -11,   -7,   -7,  -11,   -3,   13,
/*   36*/   13,   -3,    5,   13,   13,    5,  -11,    9,
/*   40*/    9,  -11,   -7,   13,   13,   -7,  -15,    1,
/*   44*/    1,  -15,  -15,   -3,   -3,  -15,  -11,  -11,
/*   48*/    9,   13,   13,    9,  -15,    5,    5,  -15,
/*   52*/  -15,   -7,   -7,  -15,    1,   17,  -11,   13,
/*   56*/   17,    1,   13,  -11,   -3,   17,   17,   -3,
/*   60*/  -15,    9,    9,  -15,    5,   17,   17,    5,
/*   64*/   -7,   17,   13,   13,   17,   -7,  -15,  -11,
/*   68*/  -11,  -15,  -19,    1,    1,  -19,    9,   17,
/*   72*/   17,    9,  -19,   -3,   -3,  -19,  -19,    5,
/*   76*/    5,  -19,  -15,   13,   13,  -15,  -11,   17,
/*   80*/  -19,   -7,   17,  -11,   -7,  -19,    1,   21,
/*   84*/  -19,    9,   21,    1,    9,  -19,   -3,   21,
/*   88*/   21,   -3,  -15,  -15,   13,   17,   17,   13,
/*   92*/    5,   21,   21,    5,  -19,  -11,  -11,  -19,
/*   96*/   -7,   21,   21,   -7,  -15,   17,   17,  -15,
/*  100*/    9,   21,   21,    9,  -19,   13,  -23,    1,
/*  104*/   13,  -19,    1,  -23,  -23,   -3,   -3,  -23,
/*  108*/  -23,    5,    5,  -23,  -11,   21,   21,  -11,
/*  112*/   17,   17,  -23,   -7,   -7,  -23,  -19,  -15,
/*  116*/  -15,  -19,   13,   21,   21,   13,  -23,    9,
/*  120*/    9,  -23,    1,   25,   25,    1,   -3,   25,
/*  124*/   25,   -3,    5,   25,  -19,   17,   25,    5,
/*  128*/  -23,  -11,   17,  -19,  -11,  -23,  -15,   21,
/*  132*/   21,  -15,   -7,   25,   25,   -7,  -23,   13,
/*  136*/   13,  -23,    9,   25,   25,    9,  -19,  -19,
/*  140*/   17,   21,   21,   17,  -27,    1,    1,  -27,
/*  144*/  -27,   -3,   -3,  -27,  -11,   25,   25,  -11,
/*  148*/  -27,    5,  -23,  -15,  -15,  -23,    5,  -27,
/*  152*/  -27,   -7,   -7,  -27
}; /* End of Power Indexed Encode Table */
```

The output of circular mapper 381 is supplied via connection 382 to scalar 384, which scales the signal on connection 382, by a factor of $2^{(S+n/2)}$. The output of scalar 384 is supplied to adder 386 where the encoded and scaled circular bits on connection 385 are combined with the embedded square bits on connection 374. The output of adder 386 is supplied via connection 387 to rotator 388, where it is rotated 0°, 90°, 180°, or 270° based on the rotation information supplied by the phase encoded bits on connection 362. Although omitted from FIG. 5, an additional scaling operation at the output of the rotator 388 will ensure that the transmitted signal power is the same for all data transmission rates. A similar inverse scaling will be performed in the receiver 400 prior to decoding. The encoder and decoder scaling are shown below in Table 3.

TABLE 3 const unsigned int rxtxscale [30] = {

| /* rx scale | tx scale |    | AVE (V*V), | PEAK, | ERROR, | SIZE, | BITS |           */    |
|---|---|---|---|---|---|---|---|---|
| 512, | 8192, | /* | 1.000, | 3.2, | 0.00000, | 1, | 1 | (Tx << 2) */ |
| 512, | 8192, | /* | 2.000, | 3.2, | 0.00000, | 1, | 2 | (Tx << 2) */ |
| 887, | 18918, | /* | 6.000, | 3.2, | −0.00018, | 2, | 3 | */ |
| 1145, | 14654, | /* | 10.000, | 5.1, | −0.00010, | 4, | 4 | */ |
| 1619, | 10362, | /* | 20.000, | 7.1, | 0.00007, | 8, | 5 | */ |
| 2318, | 7237, | /* | 41.000, | 9.1, | 0.00011, | 16, | 6 | */ |
| 3274, | 5125, | /* | 81.750, | 13.0, | −0.00012, | 32, | 7 | */ |
| 4619, | 3632, | /* | 162.750, | 18.4, | 0.00006, | 64, | 8 | */ |
| 6538, | 2566, | /* | 326.188, | 25.5, | 0.00004, | 128, | 9 | */ |
| 9244, | 1815, | /* | 651.781, | 36.1, | −0.00004, | 256, | 10 | */ |
| 13077, | 1283, | /* | 1303.938, | 51.1, | −0.00003, | 512, | 11 | */ |
| 18497, | 907, | /* | 2607.594, | 72.2, | 0.00003, | 1024, | 12 | */ |
| 26133, | 642, | /* | 5215.141, | 102.1, | −0.00001, | 2048, | 13 | */ |
| 36954, | 454, | /* | 10430.141, | 144.5, | 0.00001, | 4096, | 14 | */ |
| 52265, | 321 | /* | 20860.037, | 204.3, | 0.00001, | 8192, | 15 | */ |

}; /* END of rxtxscale */

The output of the rotator 388 is supplied via connection 306 to the filter 307 of FIG. 3.

Figure 6:
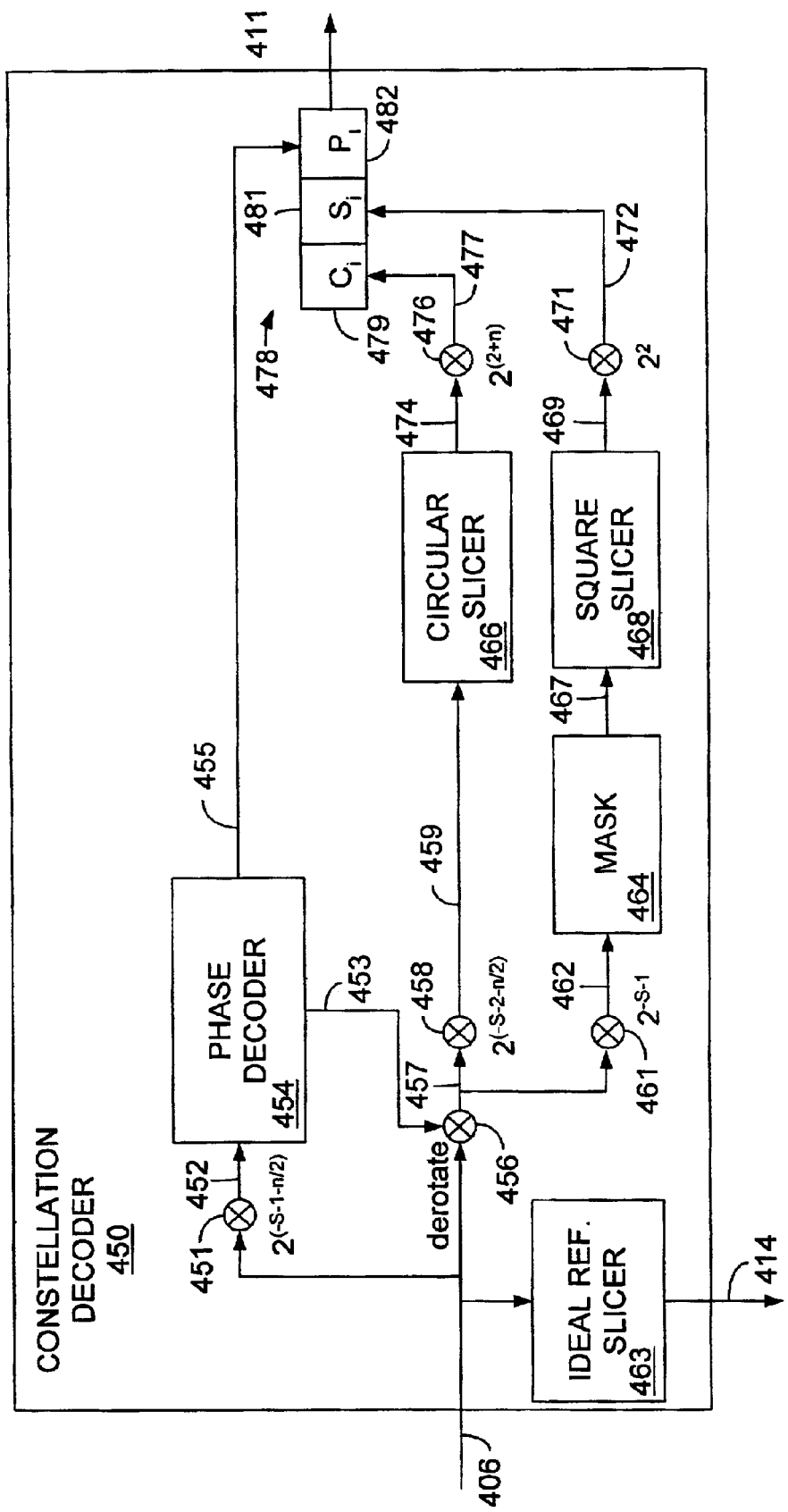
FIG. 6 is a block diagram illustrating in detail the constellation decoder of the receiver of FIG. 2.

FIG. 6 is a block diagram illustrating in detail the constellation decoder 450 of the receiver 400 of FIG. 2. The output of the filter 404 on connection 406 (FIG. 4) is supplied to the constellation decoder 450, which first slices the constellation on connection 406 using ideal reference slicer 463. Ideal reference slicer 463 develops an ideal reference signal on connection 414. The complex coordinate values X and Y are masked to determine the nearest valid point. The ideal reference signal represents the ideal X and Y values of the received symbol. The constellation on connection 406 is supplied to scalar 451, which scales the signal by the factor of $2^{(-S-1-n/2)}$ in order to recover the phase bits on connection 452. The phase bits on connection 452 are then decoded by the phase decoder 454, which decodes the phase bits and supplies the decoded phase bits on connection 455 to parallel-to-serial converter 478. The phase rotation information is supplied from the phase decoder 454 via connection 453 to the derotator 456. The phase rotation information allows all quadrants of the circular signal constellation to be decoded. The parallel-to-serial converter 478 can be implemented as a shift register. The decoded phase bits $P_i$ are placed in register position 482 of parallel-to-serial converter 478.

The received constellation on connection 406 is then inverse rotated by derotator 456 to remove the phase encoding. The derotated constellation is supplied via connection 457 to scalar 461, which scales the constellation by a factor of $2^{-S-1}$. The scaled constellation is then supplied via connection 462 to mask element 464. Mask element 464 masks to 2 or 4 bits (depending upon whether 2 of 4 bits were used to encode the embedded square constellation), with the output of the mask element 464 on connection 467 then supplied to square slicer 468. The square slicer 468 employs the square slicing table 230 (FIG. 2), illustrated below in Table 4, to decode the embedded square bits.

TABLE 4

/* Decoder slicer table for 4 bits, maximum index 15. */
const int SQBits=13;
const int eye_slicerSQ [16] = {
13,     9,     8,     12, TABLE 4-continued 5,      1,      0,      4,
7,      3,      2,      6,
15,     11,     10,     14
};          /* End of Uncoded Embedded Subset Slicer Table */

The decoded embedded square bits $S_i$ are then supplied via connection 469 to scalar 471 where they are shifted by a factor of $2^2$ to place them just above the two least significant phase bits $P_i$ 482 in the parallel-to-serial converter 478.

The circular constellation on connection 457 is supplied to scalar 458, where it is scaled by a factor of $2^{(-S-2-n/2)}$, and supplied via connection 459 to circular slicer 466. Circular slicer 466 decodes, or slices the circular bits by employing the circular slicing table 240 (FIG. 2), shown below in Table 5, and supplying the decoded bits on connection 474 to scalar 476. Scalar 476 shifts the bits on connection 474 by a factor of $2^{(2+n)}$ to place the circular decoded bits $C_i$ in the most significant bit positions of the parallel-to-serial converter 478.

Table 5 illustrates the circular constellation slicer table used for up to 9 bits per symbol in C programming format. Table 5 can be used to decode all circular constellations for up to 9 bits per symbol. Embedded square constellations then overlay onto this 8 or 9 bit base circular constellation.

For a constellation with points spaced $2^{S+1}$ apart, scalar 461, mask element 464, square slicer 468 and scalar 471 are implemented by the following C-language equation:

$S_i$=eye_slicerSQ[(x*$2^{-S-1}$)&0x3−4*((y*$2^{-S-1}$)&0x3)+12]*$2^2$; where *$2^{-S-1}$ is scalar 461, &0x3 is mask element 464, eye_slicerSQ[ ] is the square slicing table 230 (FIG. 2) associated with the square slicer 468, *$2^2$ is scalar 471, and $S_i$ are the decoded embedded square bits.

TABLE 5

```
/* Decoder slicer table for 9 bits, maximum index 153, Subset peak power 778. */
const int eye_slicer [196] = {
      0,    0,    0,    0,  146,  133,  123,  121,  125,  137,    0,    0,    0,    0,
      0,    0,    0,  131,  110,   96,   87,   83,   92,  100,  117,  140,    0,    0,
      0,    0,  126,   98,   79,   64,   58,   54,   62,   71,   90,  112,  141,    0,
      0,  135,  102,   77,   55,   41,   35,   31,   37,   48,   65,   91,  118,    0,
      0,  119,   84,   60,   39,   24,   17,   15,   20,   30,   49,   72,  101,  138,
    148,  108,   75,   50,   28,   13,    6,    4,    8,   21,   38,   63,   93,  127,
    142,  103,   69,   43,   22,    9,    1,    0,    5,   16,   32,   56,   85,  122,
    144,  106,   73,   45,   25,   11,    3,    2,    7,   18,   36,   59,   88,  124,
    152,  113,   80,   52,   33,   19,   12,   10,   14,   26,   42,   66,   97,  134,
      0,  128,   94,   67,   47,   34,   27,   23,   29,   40,   57,   81,  111,  147,
      0,  149,  115,   89,   68,   53,   46,   44,   51,   61,   78,   99,  132,    0,
      0,    0,  139,  116,   95,   82,   74,   70,   76,   86,  104,  129,    0,    0,
      0,    0,    0,  150,  130,  114,  107,  105,  109,  120,  136,    0,    0,    0,
      0,    0,    0,    0,    0,  153,  145,  143,  151,    0,    0,    0,    0,    0
};      /* End of Uncoded Subset Slicer Table */
```

Figure 7:
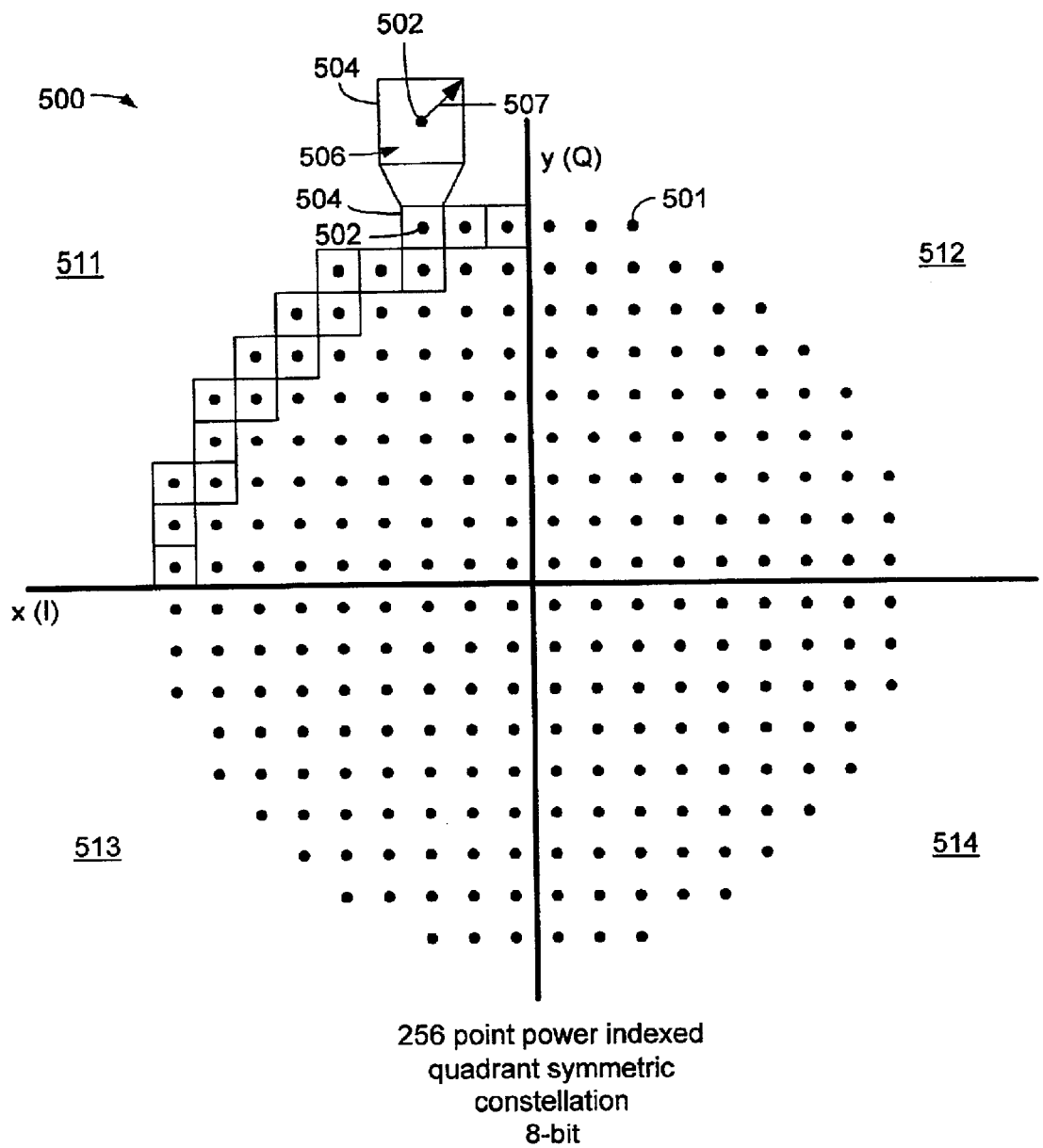
FIG. 7 is a graphical representation illustrating a conventional 256 point power indexed quadrant symmetric circular signal constellation capable of encoding up to 8 bits.

FIG. 7 is a graphical representation illustrating a conventional 256 point power indexed quadrant symmetric circular signal constellation 500 capable of encoding up to 8 bits. Although the following description will refer to embedding a square constellation into an 8 bit circular constellation to encode two additional bits using the above-described embedded square constellation methodology, the invention is equally applicable to larger circular constellations and multiple embedded square constellations. The 256 point power indexed quadrant symmetric constellation 500 is generated from the first 64 values of the subset constellation shown in Table 5 by rotating those 64 points through 0°, 90°, 180°, and 270°. However, for ease of illustration it is assumed that the constellation 500 includes only 256 points. The circular constellation 500 includes four quadrants 511, 512, 513 and 514, which are divided by a real (x) and imaginary (y) axis. The circular constellation 500 includes 256 points, exemplar ones of which are illustrated using reference numerals 501 and 502. Each point in the circular constellation represents a unique amplitude and phase of a communication signal. Each point can be thought to be the center of a respective square, an exemplar one of which is illustrated using reference numeral 504, where each square identifies an error free slicing region. Specifically, a constellation point appearing anywhere within the square 504 is decoded as the point at the center of the square. For example, as shown in FIG. 7, the signal point 502 is shown as being in the center of a region 506. However, a point received anywhere within region 506 will be interpreted by the constellation decoder 450 as being the point 502. The arrow 507 illustrates the magnitude of the error free slicing region 506 for the constellation point 502. The circular mapping table 220 (FIG. 2 and Table 2) and the circular slicing table 240 (FIG. 2 and Table 5) are generally used to encode and decode, respectively, the circular constellations with complete freedom to allocate any point distribution desired. The best distribution is one being closest to a true circle. It is desirable to use the best set of the lowest power points.

Figure 8:
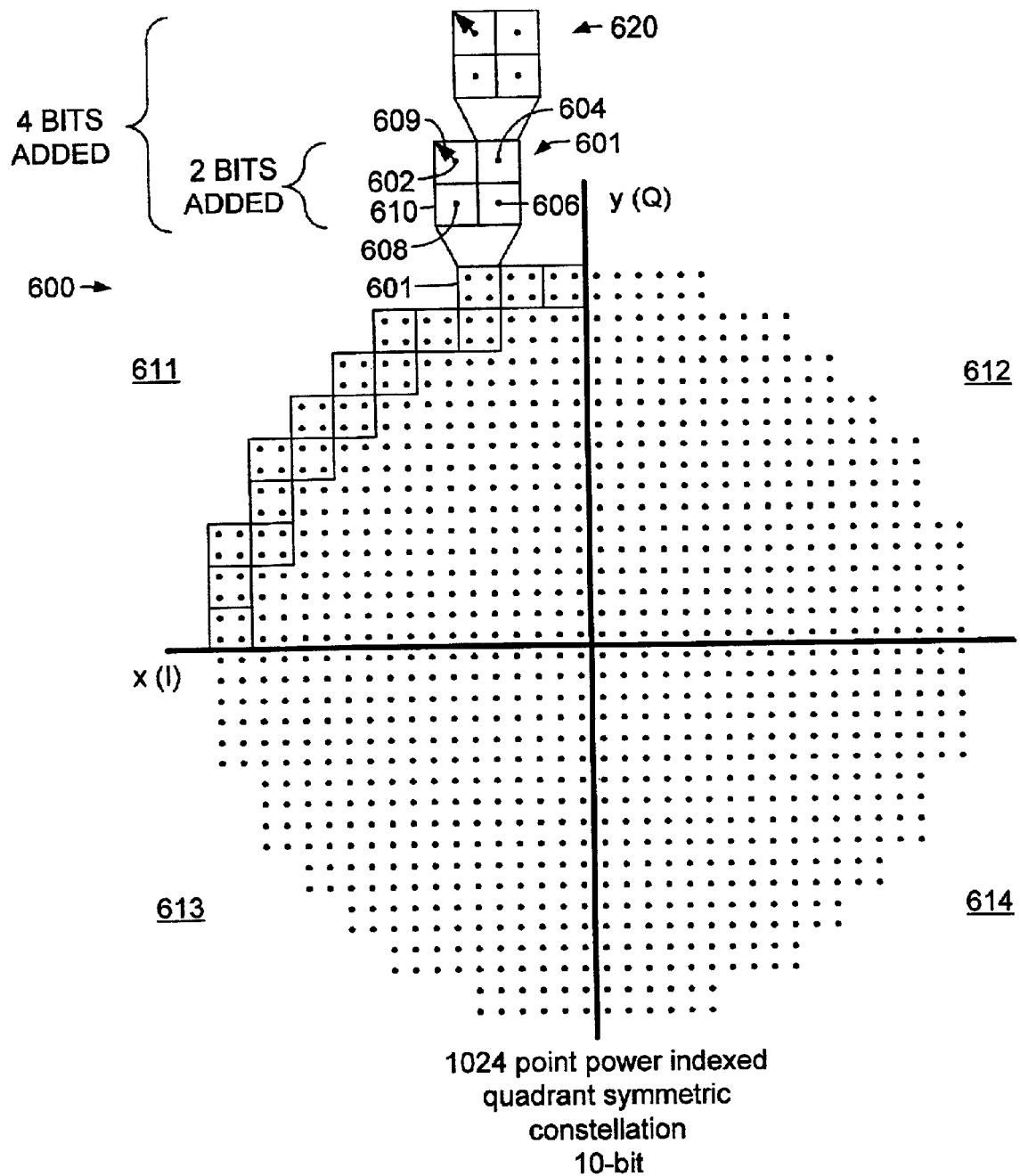
FIG. 8 is a graphical illustration showing the effect of a square constellation embedded within the 8 bit circular constellation of FIG. 7.

FIG. 8 is a graphical illustration showing the effect of a square constellation embedded within the 8 bit circular constellation 500 of FIG. 7. The constellation of FIG. 8 having the embedded square constellations has the same general layout as the 8 bit constellation shown in FIG. 7, but with four points per square instead of the single point is now a 1024 point constellation. For example, the square region 601 in FIG. 8 corresponds to the error free slicing region 506 of FIG. 7. However, the square region 601 includes four signal points 602, 604, 606 and 608, each of which include a square region, an exemplar one of which is illustrated using reference numeral 610, that represents the error free slicing region for each of the four points 602, 604, 606 and 608. A signal constellation, such as shown in FIG. 8, is sliced in two steps as illustrated above. First, the constellation is sliced using the 8 bit (although a circular constellation larger than 8 bits may be used) circular slicing table 240 (FIG. 2 and Table 5). Then, each square is further sliced to identify each of the four points (the embedded square constellation points associated with each circular constellation signal point) using the square slicing table 230 (FIG. 2 and Table 4). Furthermore, as shown using embedded square constellation 620, an embedded square constellation such as the square signal constellation located in square region 601 and point 604 may have another embedded square constellation embedded therein. The square may be then subdivided into 16, 64 or more points to increase the number of bits per symbol.

Figure 9:
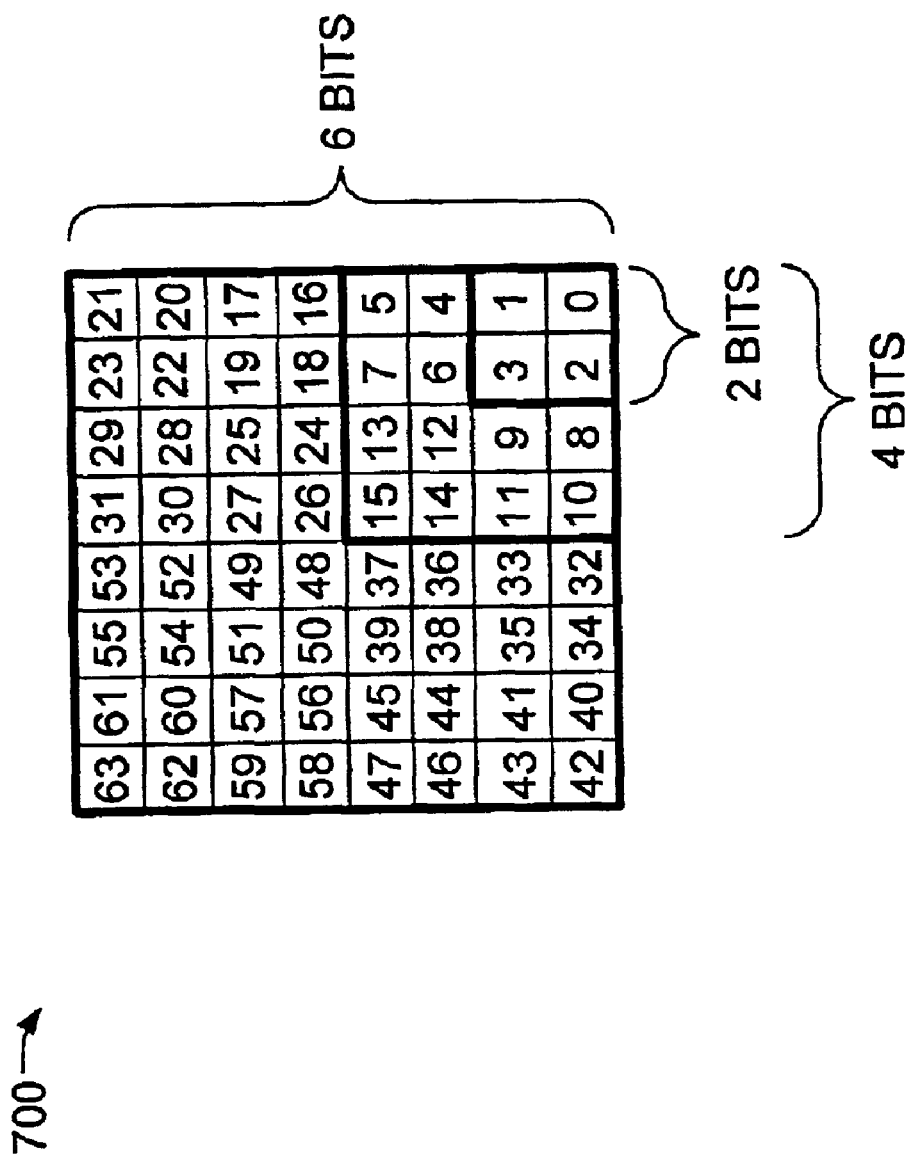
FIG. 9 is a graphical illustration showing one possible index assignment for each embedded square constellation.

FIG. 9 is a graphical illustration showing one possible index assignment for each embedded square constellation. The constellation density increases in powers of four from either the 8 or 9 bit base circular constellation (an 8 bit constellation is shown in FIG. 7). The embedded square signal constellations are preferable over conventional square or cross-constellations for 8 or more bits per symbol. For example, by embedding square constellations in base circular constellations of 11 and 12 bits, 13 or more bits per symbol can be achieved. For example, it is possible to encode four point squares to achieve 13 or 14 bits per symbol and then 16 point squares to achieve 15 or 16 bits per symbol using a base 11 or 12 bit circular constellation, respectively. This is reasonable because the mapping and slicing tables associated with a 12 bit circular signal constellation include 3,714 words and such a table is manageable with existing components.

Figure 10:
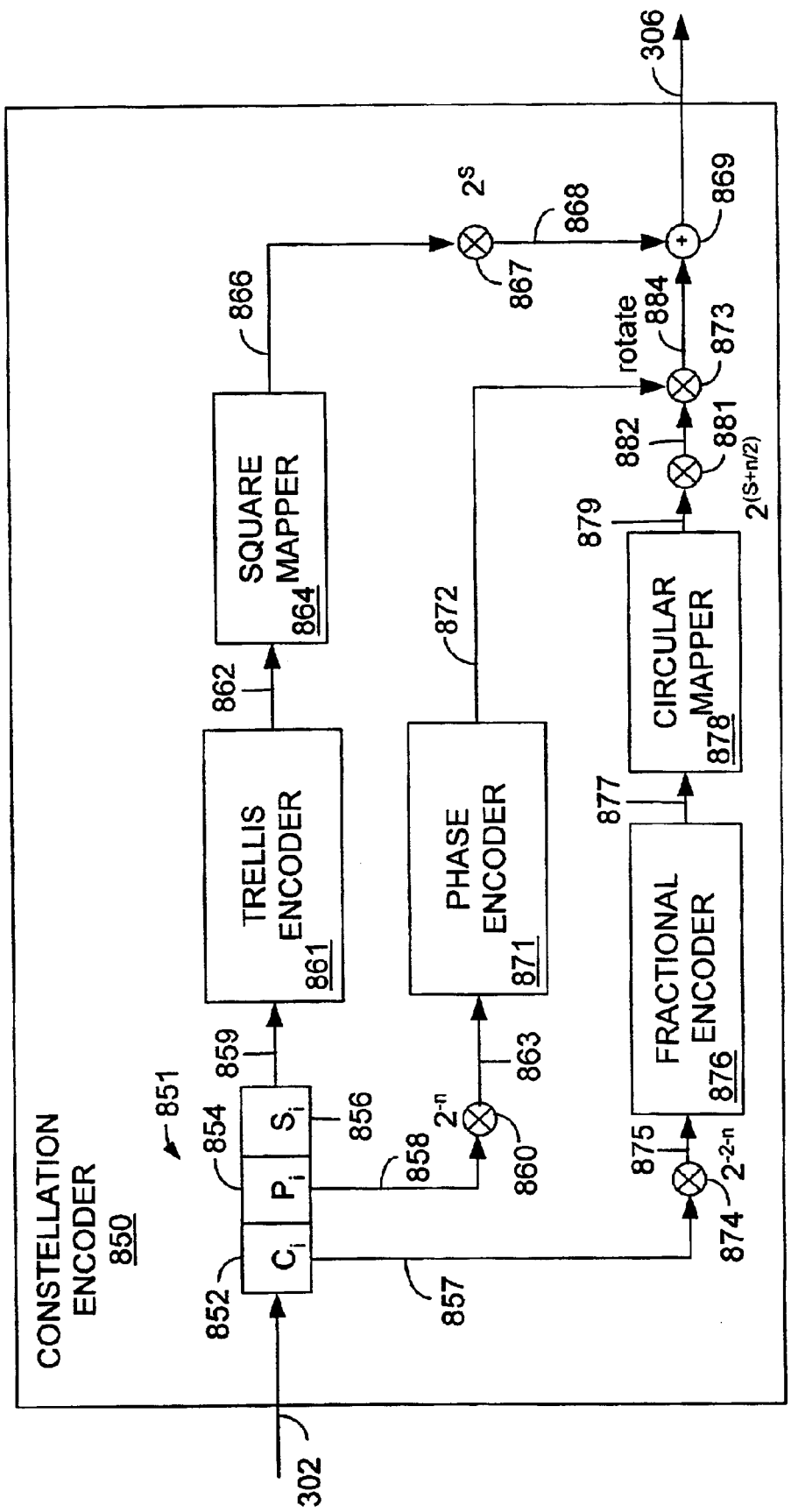
FIG. 10 is a block diagram illustrating in detail an alternative embodiment of the constellation encoder of FIG. 5.

FIG. 10 is a block diagram illustrating in detail an alternative embodiment 850 of the constellation encoder 350 of FIG. 5. The constellation encoder 850 includes trellis encoding and the ability to encode fractional bit rates. The data, in the form of a serial bit stream, is supplied from the scrambler 301 (FIG. 3) on connection 302 to serial-to-parallel converter 851. The serial-to-parallel converter 851 can be implemented as a shift register that partitions the serial bit stream into three parallel levels of bits. However, in the constellation encoder 850, the order of the bits is modified from that shown in FIG. 5. In the constellation encoder 850, the least significant bits are the embedded square bits $S_i$ 856, which are supplied on connection 859 to trellis encoder 861. The trellis encoder operates on the n square bits to generate a $2^n$ point constellation on connection 859, where n=2, 4, etc., to provide forward error correction in the form of a trellis code. The trellis encoded bits are then supplied via connection 862 to the square mapper 864.

The square mapper 864, which uses the embedded square mapping table shown in Table 1 above (and in FIG. 2 as the square mapping table 210) to encode an embedded square signal constellation into each point of a circular signal constellation. The output of the square mapper 864 on connection 866 is then supplied to scalar 867, where the value on connection 866 is scaled by a factor of $2^S$, where S is any convenient scalar, typically 7 or 8. This yields a mapped embedded square vector output on connection 868.

The next bits in the serial-to-parallel converter 851 are the phase bits $P_i$ 854 and are supplied to scalar 860, where the value on connection 858 is scaled by a factor of $2^{-n}$. The scaled phase bits are then supplied to phase encoder 871 via connection 863. The phase encoder 871 either directly or differentially phase encodes the two bits $P_i$ and supplies these phase encoded bits via connection 872 to rotator 873. When a power indexed signal constellation is used, the two phase encoded bits determine whether the circular constellation is rotated 0°, 90°, 180° or 270°.

The circular bits $C_i$ 852 are supplied via connection 857 to scalar 874. The bits on connection 857 are scaled by a factor of $2^{-2-n}$ where n is the number of embedded square bits $S_i$ 856. This scaling operation effectively shifts away the embedded square and phase bits leaving only the circular bits $C_i$ 852. The output of the scalar 874 on connection 875 is supplied to fractional encoder 876. In a single carrier communication environment, such as QAM, CAP, PAM, etc., fractional encoding can be accomplished using modulus conversion or other means such as constellation switching or shell mapping. Modulus conversion is a technique well known in the art of data communications for allowing the transmission of fractional bit rates, and is described in U.S. Pat. No. 5,103,227. Constellation switching allows the transmission of fractional bit rates by, for example, first transmitting 6 bits in one symbol and 7 bits in the next symbol if it is desired to transmit 6½ bits. For 6¾ bits one would transmit 7 bits per symbol for three symbol cycles and transmit 6 bits per symbol for the fourth symbol cycle. Shell mapping blocks the data into frames and a shell mapping algorithm is used to map the frames of data into a constellation of a certain size.

In the case of multiple carrier transmission, such as DMT, the fractional encoder 876 can be used to encode a fractional, or non-integer number of bits onto each DMT carrier tone in accordance with that disclosed in commonly assigned, co-pending U.S. patent application Ser. No. 09/717,436, entitled "FRACTIONAL BIT RATE ENCODING IN A DISCRETE MULTI-TONE COMMUNICATION SYSTEM,". The fractional encoder 876 operates on groups of words to encode a fractional (i.e., non-integer) number of bits on each tone. The fractional encoder 876 generates n constellations for n carrier tones simultaneously, in order to add a fraction of a bit to each carrier tone.

The fractionally encoded bit stream is supplied via connection 877 to circular mapper 878. Circular mapper 878 uses the circular mapping table shown above in Table 2 to map the circular bits on connection 877 into a circular signal constellation.

The output of circular mapper 878 is supplied via connection 879 to scalar 881, which scales the signal on connection 879 by a factor of $2^{(S+n/2)}$. The output of scalar 881 is supplied via connection 882 to rotator 873, where it is rotated 0°, 90°, 180°, or 270° based on the rotation information supplied by the phase encoded bits on connection 872. The output of the rotator 873 is supplied over connection 884 to adder 869 where the encoded and scaled circular and phase bits on connection 884 are combined with the trellis encoded embedded square bits on connection 868. The output of the adder 869 is supplied via connection 306 to the filter 307 of FIG. 3. Although omitted from FIG. 10, an additional scaling operation at the output of the adder 869 will ensure that the transmitted signal power is the same for all data transmission rates. A similar inverse scaling will be performed in the receiver 400 prior to decoding.

Alternatively, the trellis encoder 861 and the fractional encoder 876 of FIG. 10 can be configured to operate in the embodiment of FIG. 5. The fractional encoder 876 would operate on the circular bits $C_i$ on connection 379 and the trellis encoder 861 would operate on the phase bits $P_i$ on connection 359.

Figure 11:
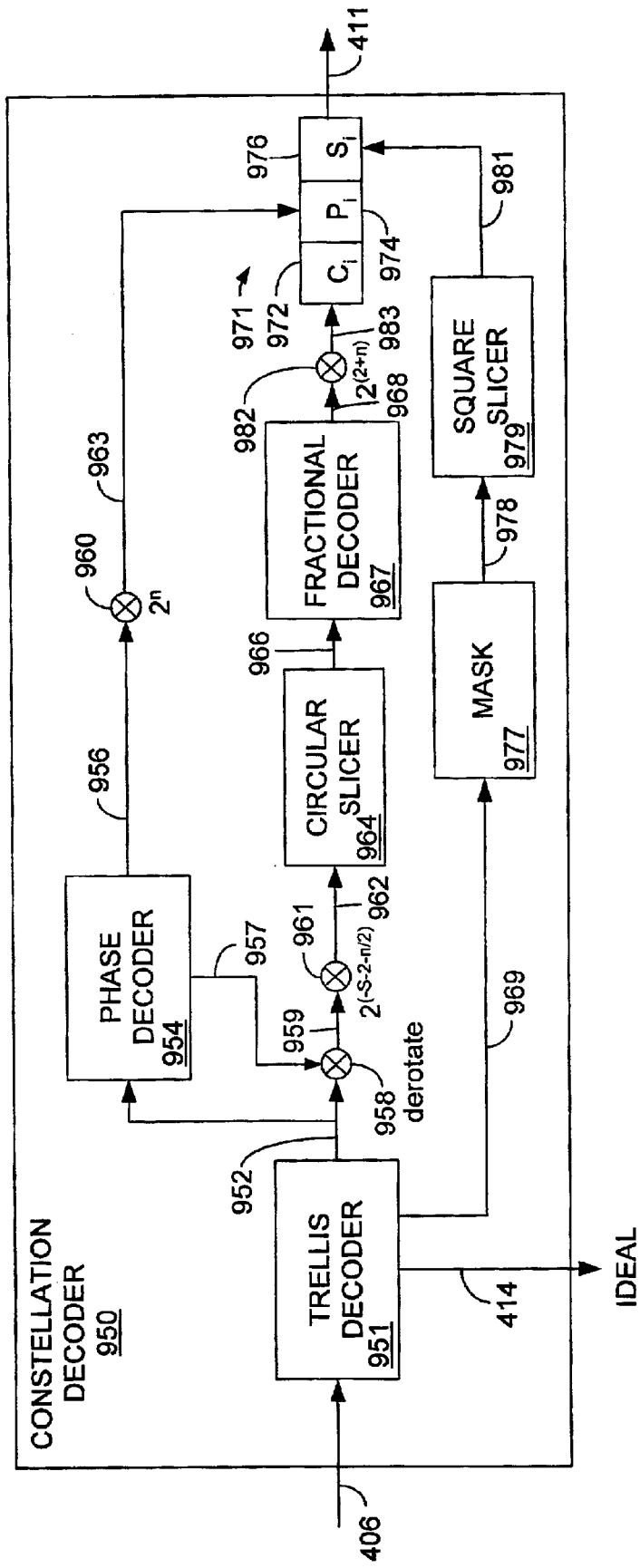
FIG. 11 is a block diagram illustrating in detail an alternative embodiment of the constellation decoder of FIG. 6.

FIG. 11 is a block diagram illustrating in detail an alternative embodiment 950 of the constellation decoder 450 of FIG. 6. The output of the filter 404 on connection 406 (FIG. 4) is supplied to the trellis decoder 951, which performs the inverse operation of the trellis encoder 861 (FIG. 10) and supplies a trellis decoded constellation on connection 952. The trellis decoder 951 also supplies over connection 969 the embedded square bits $S_i$ to mask element 977. An ideal reference signal is output from the trellis decoder 951 on connection 414.

Mask element 977 masks to 2 or 4 bits (depending upon whether 2 of 4 bits were used to encode the embedded square constellation), with the output of the mask element 977 on connection 978 then supplied to square slicer 979. The square slicer 979 employs the square slicing table 230 (FIG. 2), illustrated in Table 4, to decode the embedded square bits.

The decoded embedded square bits $S_i$ are then supplied via connection 981 to the least significant locations 976 in the parallel-to-serial converter 971. The parallel-to-serial converter 971 may be implemented as a shift register.

The constellation on connection 952 is also supplied to phase decoder 954. The phase decoder 954 decodes the phase bits and supplies the decoded phase bits $P_i$ 974 on connection 956 to scalar 960, where the decoded phase bits are scaled by a factor of 2' to shift the phase bits $P_i$ to a location above the square bits $S_i$ in the parallel-to-serial converter 971. The scaled phase bits are supplied via connection 963 to the parallel-to-serial converter 971.

To remove the phase encoding, the received signal representing the circular constellation on connection 952 is inverse rotated by rotator 958 based on a signal supplied by phase decoder 954 on connection 957. The derotated circular constellation is supplied via connection 959 to scalar 961, which scales the constellation, by a factor of $2^{(-S-2-n/2)}$. The scaled circular constellation is then supplied via connection 962 to circular slicer 964. Circular slicer 964 decodes, or slices the circular bits by employing the circular slicing table 240 (FIG. 2), shown in Table 5, and supplying the decoded bits on connection 966 to fractional decoder 967. The fractional decoder 967 converts the groups of indices, or words representing the circular bits, into a new set of binary words, which are restored in their original order. The circular bit output $C_i$ of the fractional decoder 967 is supplied via connection 968 to scalar 982, where the value of the circular bits $C_i$ is scaled by a factor of $2^{2+n}$ to locate the circular bits $C_i$ above the phase bits $P_i$ in the parallel-to-serial converter 971. The circular bits $C_i$ are supplied from the scalar 982 via connection 983 to the most significant bit location 972 of the parallel-to-serial converter 971. Alternatively, the trellis decoder 951 and the fractional decoder 967 of FIG. 11 can be configured to operate on the embodiment of FIG. 6. The trellis decoder 951 would operate on the input on connection 406 and the fractional decoder 967 would be configured to operate on the circular bits $C_i$ on connection 474.

While various embodiments of the invention have been described, it will be apparent to those of ordinary skill in the art that many more embodiments and implementations are possible that are within the scope of this invention. For example, although illustrated using circular constellations having signal points arranged on an orthogonal axis (on a square structure), it is possible to develop circular signal constellation having points arranged in a hexagonal format. In such an arrangement, embedded hexagonal constellations could be used instead of embedded square constellations. Accordingly, all such embodiments are to be construed to be within the scope of the invention.

Therefore the following is claimed:

1. A system for data communication, comprising:

a transmitter;

a constellation encoder associated with the transmitter, the constellation encoder configured to develop a signal constellation, the signal constellation comprising a plurality of primary signal points, and a plurality of secondary signal points, each primary signal point surrounded by an error-free slicing region and associated with a subset of the plurality of secondary signal points, and each secondary signal point in the subset associated with one of the primary signal points being located within the error-free region surrounding the associated primary signal point.

2. The system of claim 1, further comprising:

a receiver configured to receive the signal constellation; and a constellation decoder configured to decode the plurality of primary signal points and the plurality of secondary signal points.

3. The system of claim 2, further comprising a first mapping table associated with the constellation encoder and a first slicing table associated with the constellation decoder, where the first mapping table is used to encode the primary signal points and the first slicing table is used to decode the primary signal points.

4. The system of claim 3, further comprising a second mapping table associated with the encoder and a second slicing table associated with the decoder, where the second mapping table is used to encode the secondary signal points and the second slicing table is used to decode the secondary signal points.

5. The system of claim 1, further comprising a trellis encoder associated with the constellation encoder and configured to trellis encode the secondary signal points.

6. The system of claim 1, further comprising a fractional encoder associated with the constellation encoder and configured to fractionally encode the primary signal points.

7. The system of claim 5, further comprising:

a receiver configured to receive the signal constellation;

a constellation decoder configured to decode the plurality of primary signal points and the plurality of secondary signal points; and a trellis decoder associated with the constellation decoder and configured to trellis decode the secondary signal points.

8. The system of claim 6, further comprising:

a receiver configured to receive the signal constellation;

a constellation decoder configured to decode the plurality of primary signal points and the plurality of secondary signal points; and a fractional decoder associated with the constellation decoder and configured to fractionally decode the primary signal points.

9. The system of claim 1, wherein the plurality of primary signal points are arranged as a circular signal constellation and the plurality of secondary signal points are arranged as a square signal constellation.

10. A method for data communication, comprising the steps of:

providing a transmit signal to a transmitter;

providing a data word to a constellation encoder associated with the transmitter;

developing a signal constellation, the signal constellation comprising a plurality of primary signal points, and a plurality of secondary signal points, each primary signal point surrounded by an error-free slicing region and associated with a subset of the plurality of secondary signal points, and each secondary signal point in the subset associated with one of the primary signal points being located within the error-free region surrounding the associated primary signal point.

11. The method of claim 10, further comprising the steps of:

receiving the signal constellation; and decoding the plurality of primary signal points and the plurality of secondary signal points.

12. The method of claim 11, further comprising the steps of:

encoding the primary signal points using a first mapping table; and decoding the primary signal points using a first slicing table.

13. The method of claim 12, further comprising the steps of:

encoding the secondary signal points using a second mapping table; and decoding the secondary signal points using a second slicing table.

14. The method of claim 10, further comprising the steps of:

encoding the secondary signal points using a second mapping table; and decoding the secondary signal points using a second slicing table.

15. The method of claim 10, further comprising the step of fractionally encoding the primary signal points.

16. The method of claim 14, further comprising the steps of:

receiving the signal constellation;

decoding the plurality of primary signal points and the plurality of secondary signal points; and trellis decoding the secondary signal points.

17. The method of claim 15, further comprising the steps of:

receiving the signal constellation;

decoding the plurality of primary signal points and the plurality of secondary signal points; and fractionally decoding the primary signal points.

18. The method of claim 10, further comprising the steps of:

arranging the plurality of primary signal points as a circular signal constellation; and arranging the plurality of secondary signal points as a square signal constellation.

19. A system for data communication, comprising:

means for providing a transmit signal to a transmitter;

means for providing a data word to a constellation encoder associated with the transmitter;

means for developing a signal constellation, the signal constellation comprising a plurality of primary signal points, and a plurality of secondary signal points, each primary signal point surrounded by an error-free slicing region and associated with a subset of the plurality of secondary signal points, and each secondary signal point in the subset associated with one of the primary signal points being located within the error-free region surrounding the associated primary signal point.

20. The system of claim 19, further comprising:

means for receiving the signal constellation; and means for decoding the plurality of primary signal points and the plurality of secondary signal points.

21. The system of claim 20, further comprising:

means for encoding the primary signal points using a first mapping table; and means for decoding the primary signal points using a first slicing table.

22. The system of claim 21, further comprising:

means for encoding the secondary signal points using a second mapping table; and means for decoding the secondary signal points using a second slicing table.

23. The system of claim 19, further comprising means for trellis encoding the secondary signal points.

24. The system of claim 19, further comprising means for fractionally encoding the primary signal points.

25. The system of claim 23, further comprising:

means for receiving the signal constellation;

means for decoding the plurality of primary signal points and the plurality of secondary signal points; and means for trellis decoding the secondary signal points.

26. The system of claim 24, further comprising:

means for receiving the signal constellation;

means for decoding the plurality of primary signal points and the plurality of secondary signal points; and means for fractionally decoding the primary signal points.

27. The system of claim 19, further comprising:

means for arranging the plurality of primary signal points as a circular signal constellation; and means for arranging the plurality of secondary signal points as a square signal constellation.

* * * * *